United States Patent
Bonart et al.

(10) Patent No.: US 11,718,220 B2
(45) Date of Patent: Aug. 8, 2023

(54) COMPENSATING FOR FAILED PIXELS IN PIXELATED VEHICLE HEADLAMPS

(71) Applicant: Infineon Technologies AG, Neubiberg (DE)

(72) Inventors: Dietrich Bonart, Bad Abbach (DE); Michael Weis, Planegg (DE); Gernot Unterweger, Latschach (AT); Salvatore Piccolella, Padua (IT); Adolfo De Cicco, Castel d'Azzano (IT)

(73) Assignee: Infineon Technologies AG, Neubiberg (DE)

( * ) Notice: Subject to any disclaimer, the term of this patent is extended or adjusted under 35 U.S.C. 154(b) by 222 days.

(21) Appl. No.: 17/152,519

(22) Filed: Jan. 19, 2021

(65) Prior Publication Data

US 2022/0227286 A1    Jul. 21, 2022

(51) Int. Cl.
*B60Q 1/14*    (2006.01)
*H05B 45/44*   (2020.01)
*H05B 45/12*   (2020.01)
*B60Q 1/08*    (2006.01)

(52) U.S. Cl.
CPC ............ *B60Q 1/1423* (2013.01); *B60Q 1/08* (2013.01); *H05B 45/12* (2020.01); *H05B 45/44* (2020.01)

(58) Field of Classification Search
CPC ............ B60Q 2300/10; B60Q 2300/14; B60Q 2300/146; B60Q 11/00; B60Q 11/002; B60Q 11/005; H05B 45/10; H05B 45/14; H05B 47/10; H05B 47/105; H05B 47/155; H05B 47/20; H05B 47/29
See application file for complete search history.

(56) References Cited

U.S. PATENT DOCUMENTS

| | | | |
|---|---|---|---|
| 11,071,184 B1* | 7/2021 | Chiodo | H05B 45/325 |
| 11,173,829 B1* | 11/2021 | Boecker | H05B 47/10 |
| 2004/0080273 A1* | 4/2004 | Ito | H05B 45/50 |
| | | | 315/77 |
| 2005/0179393 A1* | 8/2005 | Murakami | H05B 45/46 |
| | | | 315/80 |
| 2012/0248982 A1* | 10/2012 | Liao | F21S 43/14 |
| | | | 315/77 |
| 2015/0271895 A1* | 9/2015 | Seif | H05B 47/10 |
| | | | 315/132 |
| 2017/0267174 A1* | 9/2017 | Nakayama | B60Q 11/002 |
| 2018/0290583 A1* | 10/2018 | Park | B60Q 1/085 |
| 2019/0223267 A1* | 7/2019 | Nelson | G01J 1/32 |
| 2020/0240607 A1* | 7/2020 | Ehlert | H05B 45/50 |
| 2020/0333182 A1* | 10/2020 | Ahmed | B60Q 9/00 |
| 2021/0107397 A1* | 4/2021 | Unterweger | H05B 45/10 |
| 2021/0162916 A1* | 6/2021 | Ikenouchi | B60Q 1/143 |
| 2022/0105862 A1* | 4/2022 | Unterweger | B60Q 11/005 |
| 2022/0227286 A1* | 7/2022 | Bonart | H05B 47/125 |
| 2022/0330400 A1* | 10/2022 | Unterweger | H05B 45/30 |
| 2023/0007751 A1* | 1/2023 | Bonne | G09G 3/32 |

* cited by examiner

*Primary Examiner* — Jason Crawford
(74) *Attorney, Agent, or Firm* — Shumaker & Sieffert, P.A.

(57) ABSTRACT

A vehicle headlamp control circuit is configured to control a vehicle headlamp comprising a plurality of lighting elements. The vehicle headlamp control circuit may comprise a memory that stores information for controlling the plurality of lighting elements, and a driver circuit that drives the plurality of lighting elements based on the information, wherein the information compensates for one or more failed elements of the plurality of lighting elements.

17 Claims, 8 Drawing Sheets

COMPENSATING FOR FAILED PIXELS IN PIXELATED VEHICLE HEADLAMPS

TECHNICAL FIELD

This disclosure relates to circuits for driving and controlling pixelated light sources, such as for a vehicle headlamp comprising a matrix of light emitting diodes (LEDs) or other light sources that comprises a plurality of lighting elements that are individually controllable.

BACKGROUND

Drivers are often used to control a voltage, current, or power at a load. For instance, a light emitting diode (LED) driver may control the power supplied to a set of light emitting diodes. Some drivers may comprise a DC to DC power converter, such as a buck-boost, buck, boost, or another DC to DC converter. These or other types of DC to DC power converters may be used to control and possibly change the power at the load based on a characteristic of the load. DC to DC power converters may be especially useful for LED drivers to regulate current through LED strings.

Some LED circuits include a large number of individually controllable LEDs arranged in a two-dimensional matrix. The individually controllable LEDs can be driven so as to provide different lighting (e.g., high beam or low beam lighting) for different driving conditions, or to provide advanced lighting effects. Advanced vehicle headlamp systems, for example, are one example application of such LED circuits, whereby lighting effects associated with vehicle operation can be used to improve the driving experience and to promote vehicle safety.

SUMMARY

This disclosure is directed to circuits used for controlling and driving a pixelated light source used for advanced vehicle headlamp systems, such as a matrix of light emitting diodes (LEDs) or another type of pixelated light source. The circuits may be used to control the LEDs in a way that compensates for one or more failed LEDs within the matrix. The manufacturing of an LED matrix is difficult, an in many cases, one or more individual LEDs may be inoperable at the time the LED matrix is manufactured. Also, individual LEDs may become inoperable during use. This disclosure describes techniques and circuits for controlling an LED matrix so as to compensate for one or more failed LEDs. In particular, one or more LEDs that are positioned in close proximity to a failed LED (e.g., one or more neighboring LEDs) may be controlled in a way that can compensate for the failed LED. In some examples, the techniques may help in improve the production yield associated with the manufacturing of matrices of LEDs. In addition, in some examples, the techniques may adapt the control during use of the matrix of LEDs in order to compensate for individual LEDs that become inoperable during use.

Different ways to compensate for failed LEDs are described, such as by adjusting duty cycles used to drive neighboring LEDs or by adjusting gamma corrections used for neighboring LEDs. Different ways to implement the adjustments are also described, such as by using a graphics processing unit (GPU) that sends information to an LED driver or by using the LED driver that receives information from the GPU. Either the GPU or the LED driver may access a memory to make adjustments to information that ultimately affects LED light output.

In one example, a vehicle headlamp control circuit is configured to control a vehicle headlamp comprising a plurality of lighting elements. The vehicle headlamp control circuit may comprise a memory that stores information for controlling the plurality of lighting elements, and a driver circuit that drives the plurality of lighting elements based on the information, wherein the information compensates for one or more failed elements of the plurality of lighting elements.

In another example, a method may comprise driving a plurality of lighting elements of a vehicle headlamp based on information, wherein the information compensates for one or more failed elements of the plurality of lighting elements.

In another example, a system may comprise a vehicle headlamp comprising a plurality of lighting elements, and a vehicle headlamp control circuit configured to control the vehicle headlamp. In this example, the vehicle headlamp control circuit may comprise a memory that stores information for controlling the plurality of lighting elements, and a driver circuit that drives the plurality of lighting elements based on the information, wherein the information compensates for one or more failed elements of the plurality of lighting elements.

Details of these and other examples are set forth in the accompanying drawings and the description below. Other features, objects, and advantages will be apparent from the description and drawings, and from the claims.

DETAILED DESCRIPTION

Figure 1:
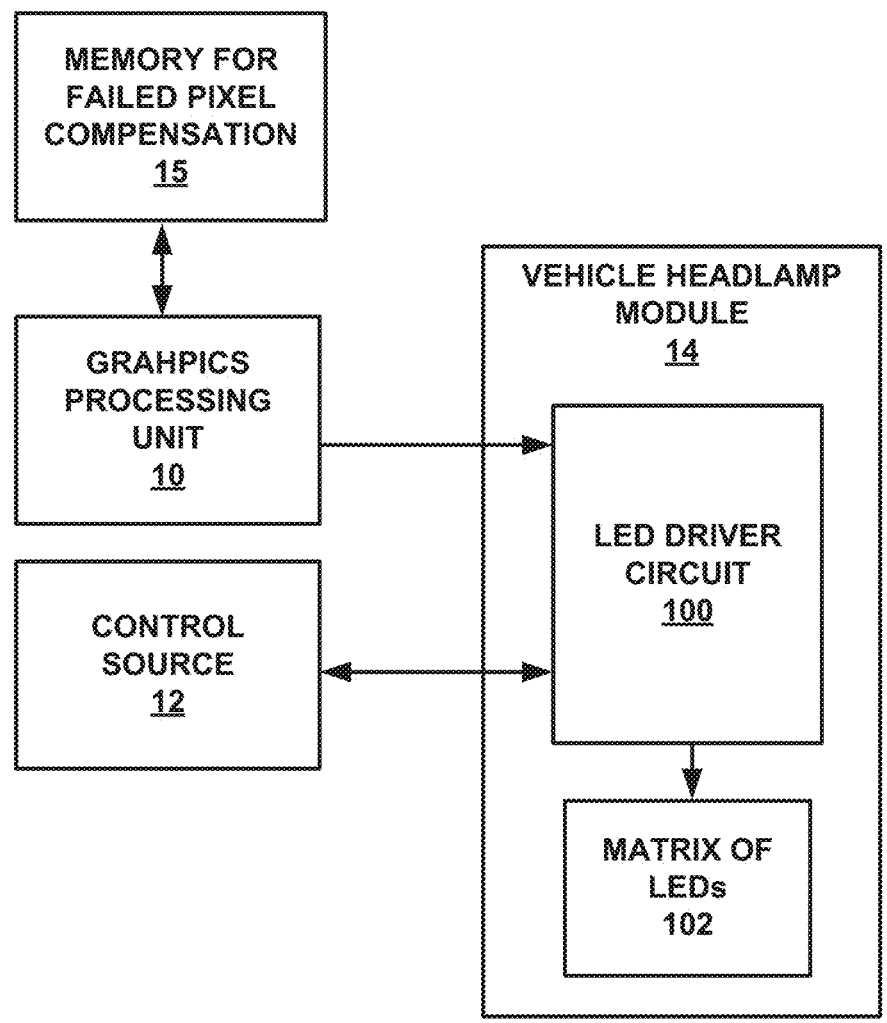
FIG. 1 is a block diagram illustrating a vehicle headlamp circuit comprising a pixel light source that includes a memory to store information used to compensate for failed pixels.

This disclosure is directed to circuits used for controlling and driving a pixelated light source used for advanced vehicle headlamp systems, such as a matrix of light emitting diodes (LEDs). The circuits of this disclosure may be used to control the LEDs in a way that compensates for one or more failed LEDs within the matrix. In particular, one or more LEDs that are positioned in close proximity to a failed LED (e.g., one or more neighboring LEDs) may be controlled in a way that can compensate for the failed LED based on cross-talk. In other words, the lighting of neighboring pixels can be enhanced in a way that can compensate for the failed LED and possibly make the failure imperceivable to the human eye.

According to this disclosure, a memory may be used to store locations of failed LEDs and/or to store driving values for operable LEDs. The driving values associated with neighboring LEDs that neighbor a failed LED may compensate for one or more failed pixels. For example, compensating driving values associated with pixels that neighbor a failed pixel may be larger than the standard driving values, and this may substantially compensate for the failed pixel based on cross-talk of the light output by the neighboring LEDs.

The manufacturing of an LED matrix is difficult, and in many cases, one or more individual LEDs may be inoperable at the time the LED matrix is manufactured. Accordingly, in some examples, the techniques of this disclosure may be used to improve the production yield associated with the manufacturing of LED matrices. In this case, by compensating for one or more failed LEDs within the matrix, the matrix may be used in vehicles or sold to customers, rather than being discarded due to failed pixels. Memory can be configured at the time of manufacture to identify locations of failed pixels or locations of neighboring pixels to the failed pixel, and information stored in the memory can be used to adjust information used by a driver circuit to drive the LEDs in a way that compensates for the failed pixels.

However, there may be a limit on the number of failed pixels that can be compensated. In some examples, if the number of failed pixels at the time of manufacturing the LED matrix is above the limit, then the LED matrix may be discarded as defective. However, if the number of failed pixels at the time of manufacture is less than the limit, then the techniques of this disclosure may be implemented to compensate for the failed pixels.

In some examples, the techniques of this disclosure may also be used to compensate for one or more individual LEDs that become inoperable during use of the LEDs. Due to wear and tear, an individual LED may become shorted or otherwise inoperable during its use. In this case, according to techniques of this disclosure, an LED driver or other circuitry may be able to identify such LEDs when they become inoperable. Accordingly, in some examples, the techniques of this disclosure may adapt LED control during use of the matrix of LEDs in order to compensate for individual LEDs that become inoperable during use.

Different ways to compensate for failed LEDs are also described herein. In some example, the techniques of this disclosure may adjust duty cycles used to drive neighboring LEDs, or in other examples, the techniques may adjust gamma corrections used for neighboring LEDs. The duty cycles of individual LEDs may be controlled to define the brightness of the LEDs. Thus, by adjusting the duty cycles of LEDs that neighbor a failed LED, lighting compensation for the failed LED can be achieved by the enhanced brightness produced by the neighboring LEDs. Alternatively (or additionally), so-called "gamma corrections" may be used to enhance the brightness of the neighboring LEDs in a way that can compensate for a failed pixel. These or other types of corrections may be performed according to this disclosure in order to improve the lighting associated with a matrix of LEDs that includes at least one failed pixel.

Different ways to implement the adjustments are also described. A graphics processing unit (GPU) may be configured to send LED driver information (e.g., bitmaps of intensity values) to an LED driver. In some examples according to this disclosure, the GPU may adjust this LED driver information to compensate for one or more failed pixels. A memory may be connected to the GPU to store information needed to facilitate the adjustments to the LED driver information. For example, the memory may store locations of failed pixels and/or locations and values of neighboring pixels used to compensate for the failed pixels.

In other examples, the LED driver (instead of the GPU) may be configured to make the adjustments to compensate for one or more failed pixels. In this case, a memory that stores information needed to facilitate the adjustments may be connected directly to the LED driver (instead of or in addition to being connected to the GPU). The LED driver may adjust LED driver information received from the GPU based on information in the memory so as to compensate for the failed pixels. These and other examples are described below.

FIG. 1 is a block diagram illustrating one example of a vehicle headlamp circuit configured to control a matrix of LEDs 102. The vehicle headlamp circuit of FIG. 1 (and other examples herein) may be used with any motorized or non-motorized vehicle that includes a headlamp, such as with cars, trucks, electric vehicles, heavy machinery, motorcycles, bicycles, scooters, watercrafts, recreational vehicles (RVs), all-terrain vehicles (ATVs), utility terrain vehicles (UTVs), golf carts, snowmobiles, self-driving vehicles, or any other type of motorized or non-motorized vehicle that includes one or more headlamps. The circuit of FIG. 1 includes a graphics processing unit (GPU) 10 that sends information to LED driver circuit 100 of vehicle headlamp module 14 to facilitate control of individual LEDs within matrix of LEDs 102. LED driver circuit 100 may comprise a DC/DC power converter configured to deliver precise amounts of current to each individual LED within the matrix of LEDs 102. LED driver circuit 100 controls lighting elements 102 based at least in part on the information sent form GPU 10, which may comprise bitmaps (e.g., images) of intensity values used for controlling individual LEDs within matrix of LEDs 102. Control source 12 may comprise a microprocessor that sends control commands to LED driver circuit 100. For example, control source 12 may control high-level lighting functions, such as on/off control, high beam/low beam control, and other high-level controls or lighting modes.

In the example of FIG. 1, a memory 15 is configured to store information for failed pixel compensation. Memory 15 may comprise any non-volatile memory circuit or storage device capable of storing information. GPU 10 applies the information stored in memory 15 to adjust the bitmaps sent to LED driver circuit 100. In this way, the circuit of FIG. 1 may compensate for one or more failed pixels within matrix of LEDs 102. Memory 15, for example, may store locations of failed pixels and/or locations of neighboring pixels to the failed pixels, which may be determined during manufacture of matrix of LEDs 102 or may be identified during operation of the matrix of LEDs 102. Alternatively or additionally, memory 15 may store driving values that include compensating values for neighboring pixel locations (i.e., pixel locations that are neighboring a failed pixel). In any case, GPU 10 may apply the information stored in memory 15 so as to compensate for one or more failed pixels within matrix of LEDs 102.

As mentioned above, the manufacturing of an LED matrix is difficult, an in many cases, one or more individual LEDs within matrix of LEDs 102 may be inoperable at the time the LED circuit is manufactured. Also, one or more individual LEDs within matrix of LEDs 102 may become inoperable during use. Some or all of the components shown in FIG. 1 (e.g., LED driver circuit 100, GPU 10, memory 15, and control source 12) may form a vehicle headlamp control circuit configured to control matrix of LEDs 102 in a way that can compensate for failed pixels.

Memory 15 stores information for controlling a plurality of LEDs within LED matrix 102, wherein the information stored in memory 15 compensates for one or more failed elements within matrix of LEDs 102. LED driver circuit 100 may comprise one or more DC/DC power converters that drive individual LEDs within matrix of LEDs 102 based on the information stored in memory 15 and received from GPU 10.

In some examples, GPU 10 communicates bitmaps to LED driver circuit 100 For advanced vehicle lighting systems, GPU 10 may be used to define bitmaps that achieve advanced lighting effects, such as glare reduction, object detection, or lighting effects, and in some cases, cameras (not shown) may be used to capture the scene being illuminated by matrix of LEDs 102. Thus, in some cases, GPU 10 may use images of the scene being illuminated to create bitmaps for driving matrix of LEDs 102. According to this disclosure, GPU 10 may also be used to implement compensation for failed pixels within matrix of LEDs 102.

In the example of FIG. 1, memory 15 is coupled to GPU 10 and the information in memory 15 is used by GPU 10 to adjust the bitmaps so as to compensate for the one or more failed LEDs within matrix of LEDs 102. In some examples, memory 15 is pre-configured to store locations of the failed elements (or neighbors thereof) or to store pre-configured driving values or adjustments for neighboring pixels to the failed LEDs. Alternatively, memory 15 may be configured with locations of the failed LEDs or locations of neighbors to failed pixels (or adjustments to neighboring pixels) that are updated during operation of the vehicle headlamp control circuit in response to failure data received from LED driver circuit 100. In this case, LED driver circuit 100 may include additional elements configured to identify failed LEDs and communicate the location of any failed LEDs back to memory 15 such as via control source 12. In this case (although not shown in FIG. 1) memory 15 may be connected to control source 12, such as via a communication bus.

In some examples, the information stored in memory 15 identifies the locations of failed LEDs (also called failed "pixels"). In some examples, the information stored in memory 15 includes standard driving values for active pixels surrounded by other active pixels, and compensating driving values for one or more active pixels that are neighboring one or more failed pixels. The compensating driving values, for example, may be larger than the standard driving values so as to compensate for the one or more failed pixels, e.g., based on cross-talk.

In some examples, the information stored in memory 15 comprises intensity values that correspond to duty cycles applied by LED driver circuit 100 in driving the matrix of LEDs 102, and at least some of the intensity values may be larger than other intensity values so as to compensate for one or more failed pixels of the matrix of LEDs 102.

Figure 2:
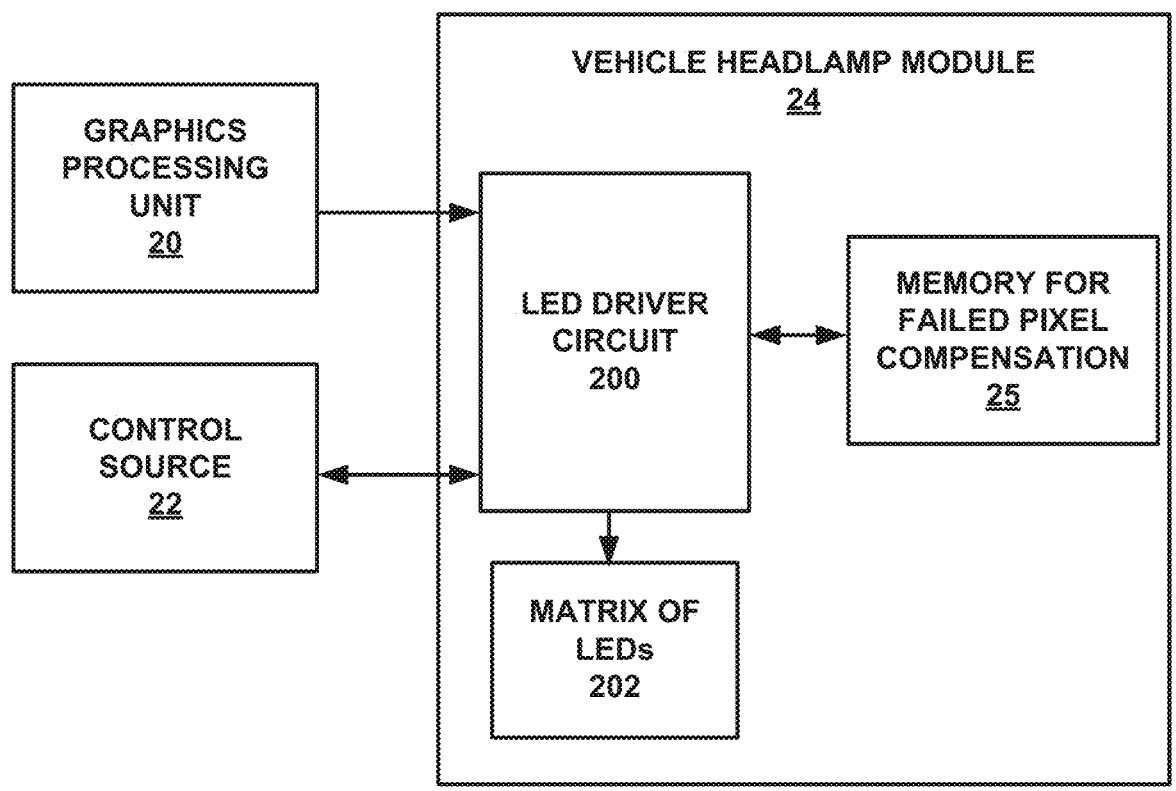
FIG. 2 is another block diagram illustrating another example of a vehicle headlamp circuit comprising a pixel light source and an external memory coupled to a video signal source, which stores information used to compensate for failed pixels.

In some examples, the information stored in memory 15 may include gamma corrections to compensate for one or more failed pixels of the matrix of LEDs. It may be more desirable to apply gamma corrections via LED driver circuit 100, however, and therefore, the example shown in FIG. 2 may be more desirable if gamma corrections are used to compensate for failed LEDs. Gamma corrections, for example, may already be performed by LED driver circuit 100, and therefore if gamma corrections are used for compensating for failed pixels, then it may be desirable to use LED driver circuit 100 for such pixel compensating gamma corrections. FIG. 2 provides an example that may be especially useful if gamma corrections are used to implement the failed pixel compensation techniques. The example shown in FIG. 1, in contrast, may be more desirable than that shown in FIG. 2 if duty cycle adjustments are used to compensate for one or more failed pixels of the plurality of LEDs.

The example shown in FIG. 2 is similar to that shown in FIG. 1. However, in the example of FIG. 2, the memory for failed pixel compensation 25 is connected directly to LED driver circuit rather than to the GPU. Like the example of FIG. 1, FIG. 2 represents a vehicle headlamp control circuit configured to control a vehicle headlamp comprising a plurality of lighting elements in the form of a matrix of LEDs 202. The vehicle headlamp control circuit may comprise a memory 25 that stores information for controlling the matrix of LEDs 202, wherein the information compensates for one or more failed elements of the plurality of lighting elements. The vehicle headlamp control circuit may also include a driver circuit 200 that drives the plurality of lighting elements based on the information. The vehicle headlamp control circuit may further include GPU 20, which sends bitmaps to LED driver circuit 200, and control source 22, which may comprise a microprocessor that controls high-level lighting functions, such as on/off control, high beam/low beam selections, advanced lighting modes, or other high-level functions.

In the example of FIG. 2, a memory 25 is configured to store information for failed pixel compensation. In this example, memory 25 is communicatively coupled to LED driver circuit 200. Memory 25 (like memory 15 of FIG. 1) may comprise any non-volatile memory circuit or storage device capable of storing information. GPU 20 sends bitmaps sent to LED driver circuit 200, and LED driver circuit 200 adjusts the bitmaps based on based on the information in memory 25 to compensate for the one or more failed LEDs within matrix of LEDs 202. In this way, the circuit of FIG. 2 may compensate for one or more failed pixels within matrix of LEDs 202.

Like the example of FIG. 1, in the example of FIG. 2, memory 25 may store locations of failed pixels (or neighbors thereof), which may be determined during manufacture of matrix of LEDs 202 or may be identified during operation of the matrix of LEDs 202. Alternatively or additionally, memory 25 may store driving values that include compensating values for neighboring pixel locations (i.e., pixel locations that are neighboring a failed pixel). In any case, LED driver circuit 200 may apply the information stored in memory 25 to bitmaps received from GPU 20 so as to compensate for one or more failed pixels within matrix of LEDs 202.

Some or all of the other components shown in FIG. 2 (e.g., LED driver circuit 200, GPU 20, memory 25, and control source 22) may form a vehicle headlamp control circuit configured to control matrix of LEDs 202 in a way that can compensate for failed pixels. Memory 25 stores information for controlling a plurality of LEDs within LED matrix 202, wherein the information stored in memory 25 compensates for one or more failed elements within matrix of LEDs 202. LED driver circuit 200 may comprise one or more DC/DC power converters that drive individual LEDs within matrix of LEDs 202 based on the information stored in memory 25 and based on bitmaps received from GPU 20. In particular, LED driver circuit 200 may adjust values in the bitmaps from GPU 20 based on information stored in memory 25, which can compensate for failed LEDs within matrix of LEDs 202.

For advanced vehicle lighting systems, GPU 20 may be used to define bitmaps that achieve advanced lighting effects, such as glare reduction, object detection, or lighting effects, and in some cases, cameras (not shown) may be used to capture the scene being illuminated by matrix of LEDs 202. Thus, in some cases, GPU 20 may use images of the scene being illuminated to create bitmaps for driving matrix of LEDs 202. According to this disclosure, after GPU 20 sends the bitmaps to LED driver circuit 200, LED driver circuit 200 may compensation techniques using information in memory 25 adjust the output of matrix of LEDs 202 to compensate for the failed pixel.

In some examples, memory 25 is pre-configured to store locations of the failed LEDs (i.e., failed pixels) or to store pre-configured driving values or to store adjustments for neighboring LEDs to the failed LEDs. Alternatively, memory 25 may be configured with locations of the failed LEDs (or adjustments to be applied to neighbors of failed LEDs) that are updated during operation of the vehicle headlamp control circuit in response to failure data received from LED driver circuit 200. In this case, LED driver circuit 200 may include additional elements configured to identify failed LEDs and store the location of any failed LEDs in memory 25 (or to store compensating values to memory 25 for neighbors to the failed LEDs that compensate for the failed LEDs).

In some examples, the information stored in memory 25 identifies the locations of failed LEDs (or neighbors thereof), and in some examples, the information stored in memory 25 includes compensating values for neighboring LEDs that neighbor a failed LED. For example, the information stored in memory 25 may include standard values for active pixels surrounded by other active pixels, and compensating values for one or more active pixels that are neighboring one or more failed pixels. The compensating values, for example, may be larger than the standard values so as to compensate for the one or more failed pixels, e.g., based on cross-talk.

In some examples, the information stored in memory 25 comprises intensity values (or adjustments to intensity values) that correspond to duty cycles applied by LED driver circuit 100 in driving the matrix of LEDs 202. In this case, at least some of the intensity values may be larger than other intensity values so as to compensate for one or more failed pixels of the matrix of LEDs 202.

In some examples, the information stored in memory 25 may include gamma corrections to compensate for one or more failed pixels of the matrix of LEDs. As noted, above, the example shown in FIG. 2 may be more desirable if gamma corrections are used to compensate for failed LEDs. Gamma corrections, for example, may already be performed by an LED driver circuit 200 to improve LED output under normal operating conditions where none of the pixels are failed. Therefore, if gamma corrections are used for compensating for failed pixels, it may be desirable to use LED driver circuit 200 for such pixel compensating gamma corrections. The example shown in FIG. 1, in contrast, may be more desirable than that shown in FIG. 2 if duty cycle adjustments are used to compensate for one or more failed elements of the plurality of lighting elements. However, like the example of FIG. 1, the example of FIG. 2 could also be used to make duty cycle adjustments to drive values received from GPU, in which case memory 25 may store such adjustments to one or more values in the bitmaps received from GPU 20.

Figure 3:
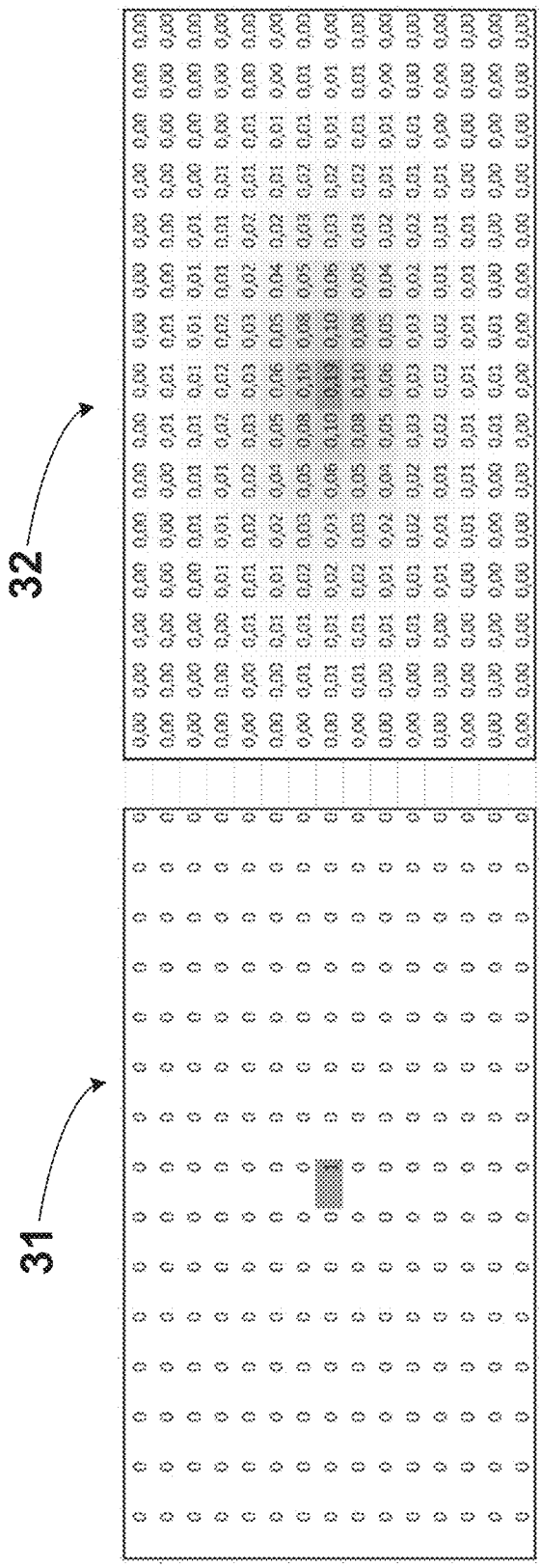
FIG. 3 is conceptual diagram showing one value used to drive one pixel and the corresponding perceived pixel output that includes cross-talk.

FIG. 3 is conceptual diagram showing one value used to drive one pixel and the corresponding perceived pixel output that includes cross-talk. In particular, image 31 shows example drive values where one value is set to one (1) and all other values are set to zero (0). If a matrix of LEDs is driven according the values shown in image 31, then the perceived output may look like that shown in image 32. The pixel location associated with the value one (1) of image 31 corresponds to a perceived output of 0.19 in image 32. Notably, however, the neighboring pixels that surround the pixel location associated with the value one (1) of image 31 have perceived intensity values in image 32 that result due to cross-talk in driving the one pixel associated with value one (1) of image 31. The techniques of this disclosure may exploit this cross-talk phenomenon to compensate for one or more failed pixels in a matrix of LEDs.

Figure 4:
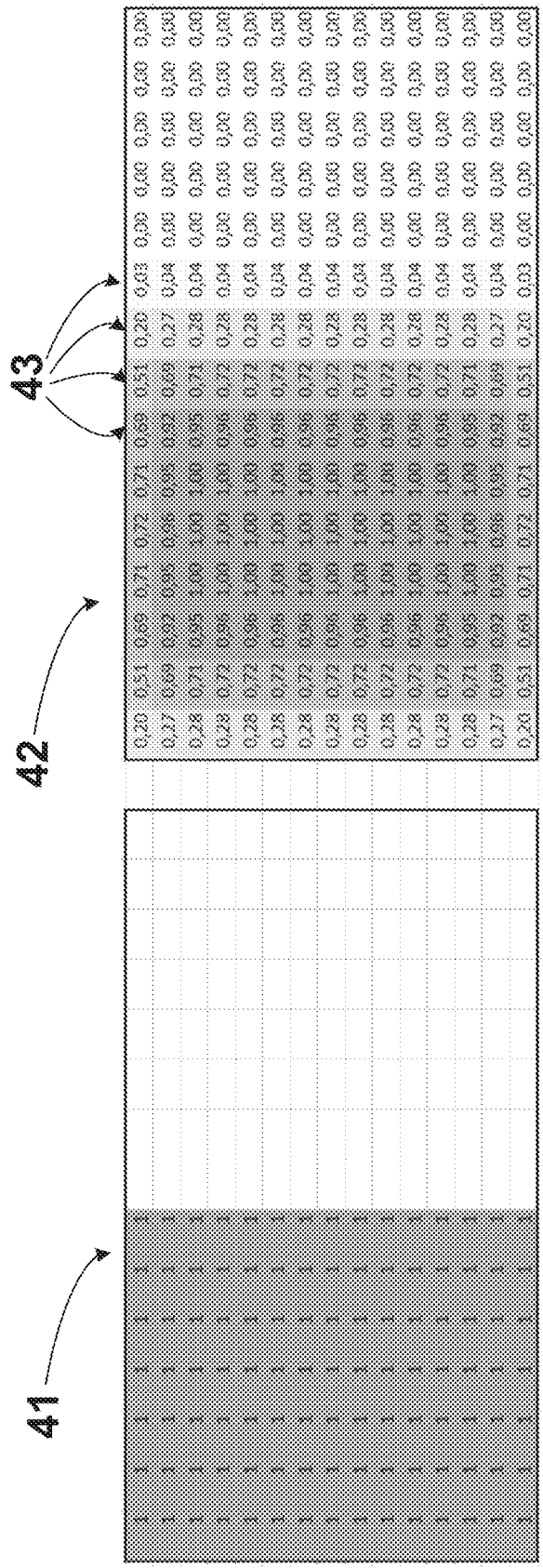
FIG. 4 is conceptual diagram showing a set of values used to drive a set of pixels and the corresponding perceived pixel output that includes cross-talk.

FIG. 4 is conceptual diagram showing a set of values used to drive a set of pixels and the corresponding perceived pixel output that includes cross-talk. In this example, image 41 on the left has driving values of one (1) for the left-most portion of image 41 and has driving values of zero (0) or nothing for the right-most portion of image 41. Image 42 shows the perceived output if a matrix of LEDs is driven according the values shown in image 41. Notably, the perceived output shown in image 42 includes cross talk effects along the border associated with the values of one (1) for the left-most portion of image 41. The center pixels in the left side of image 42 are brightest and the perceived values drop along the perimeter since the pixels in the center portion have more cross-talk with other pixels. The cross-talk further reduces for pixels on the right side of image 42 until becoming imperceivable. In some examples, a transition region 43 can be analyzed during LED circuit production to define the effects of cross talk, which can in turn help to define data used for addressing failed pixels.

Figure 5:
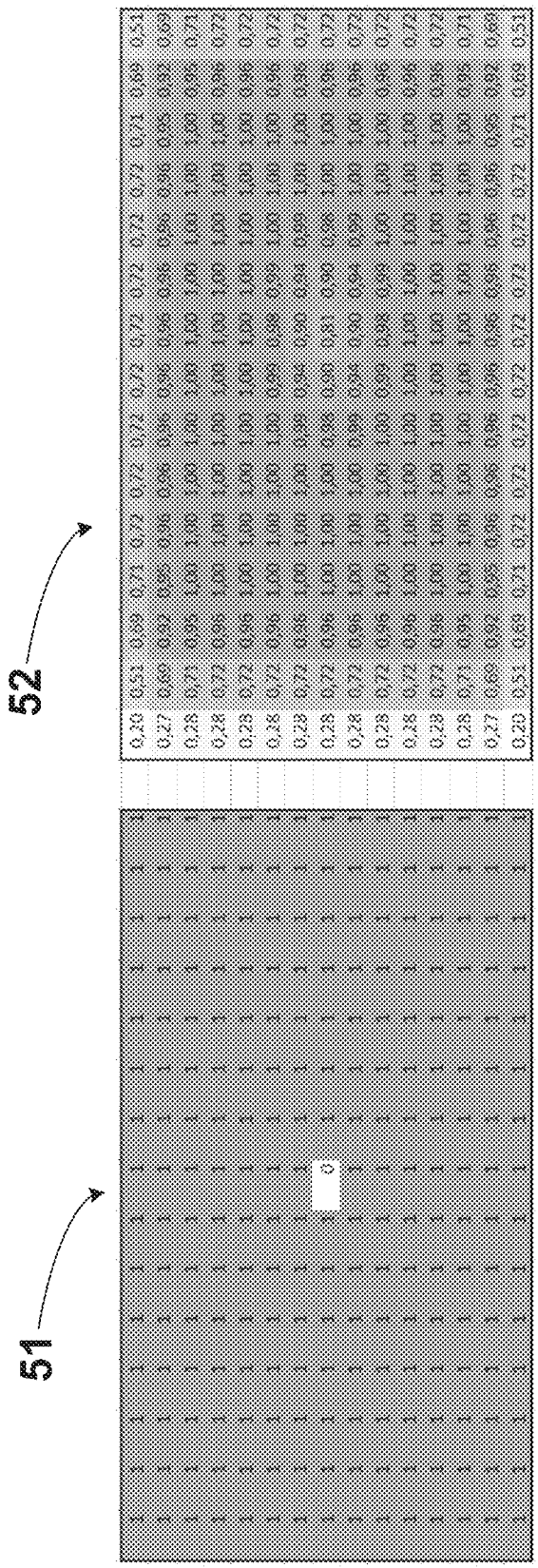
FIG. 5 is conceptual diagram showing a set of values used to drive a set of pixels, one failed pixel, and the corresponding perceived pixel output that includes cross-talk.

FIG. 5 is conceptual diagram showing a set of values used to drive a set of pixels, one failed pixel, and the corresponding perceived pixel output that includes cross-talk. In this example, image 51 shows example drive values where all of the values are set to one (1), with one failed pixel in the middle being set to zero (0). If a matrix of LEDs is driven according the values shown in image 51, then the perceived output may look like that shown in image 52. The pixel location associated with the value zero (0) of image 51 corresponds to a perceived output of 0.81 in image 52 due to the illumination from neighboring pixels causing cross-talk. The brightness is reduced due to the failed pixel, but some brightness remains due to cross-talk from neighboring LED output. The neighboring pixels in image 52 to the failed pixel associated with value zero (0) in image 51 also show some brightness reduction, due to the lack of cross-talk with the failed pixel. Also, the edges of image 52 exhibit brightness reductions relative to interior of image 52 due to the lack of cross talk on the edge (similar to image 42 of FIG. 4).

Figure 6:
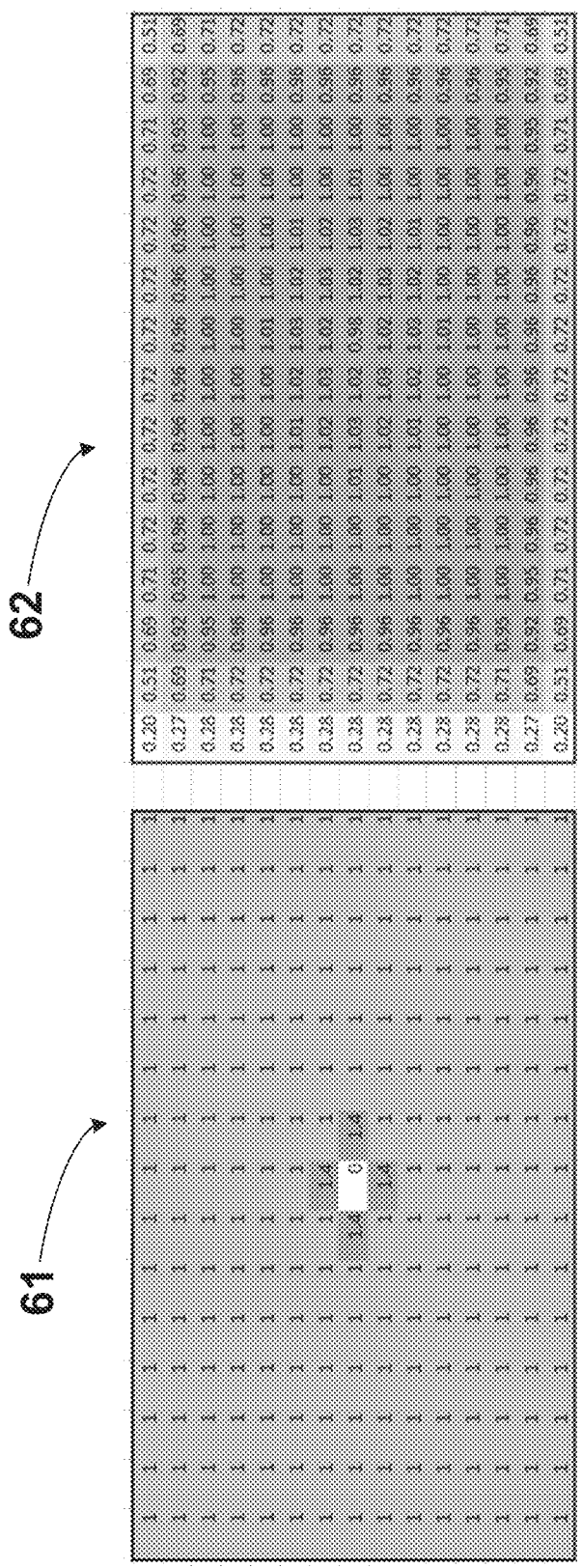
FIG. 6 is conceptual diagram showing a set of values used to drive a set of pixels, one failed pixel, compensating values surrounding the one failed pixel, and the corresponding perceived pixel output that includes cross-talk that compensates for the failed pixel.

FIG. 6 is conceptual diagram showing a set of values used to drive a set of pixels, one failed pixel, compensating values surrounding the one failed pixel, and the corresponding perceived pixel output that includes cross-talk that compensates for the failed pixel. In this example, image 61 shows example drive values where the majority of values are set to one (1), with one failed pixel in the middle being set to zero (0). Moreover, in image 61, the neighboring pixels that are direct neighbors to the failed pixel have compensating drive values of 1.4. If a matrix of LEDs is driven according the values shown in image 61, then the perceived output may look like that shown in image 62. In this case, by driving the direct neighbors of the failed pixel with compensating drive values of 1.4, the perceived output shown in image 62 has substantially uniform values of 1 (plus or minus 0.03). The techniques of this disclosure exploit this cross-talk phenomenon to compensate for one or more failed pixels in a matrix of LEDs, such as illustrated in FIG. 6 for the failed pixel in the middle of image 61 with the drive value of zero (0). In this case, by compensating for the failed pixel by driving the neighboring pixels at an increased intensity of 1.4 relative to a normal driving value of 1 (which may be achieved by adjusting duty cycles of the LEDs or by adjusting gamma values used for light output corrections), the perceived output shown in image 62 can substantially compensate for the failed pixel.

Figure 7:
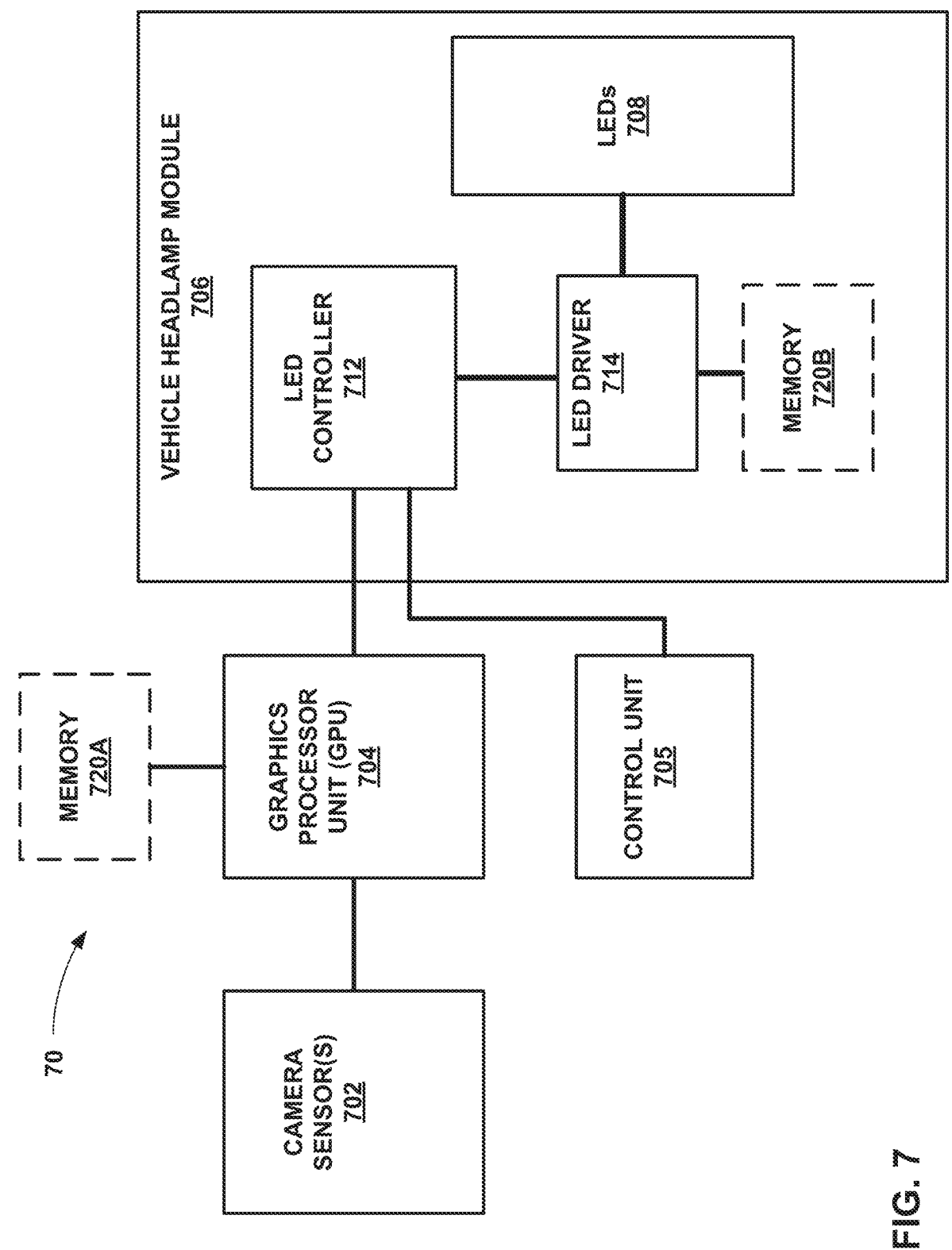
FIG. 7 is a block illustrating a vehicle headlamp circuit comprising a pixel light source and memories shown in two possible locations of the system.

FIG. 7 is a block diagram of an example system for advanced vehicle headlamps. In particular, FIG. 7 illustrates an adaptive vehicle lighting system 70 comprising one or more camera sensors 702 configured to capture video data associated with a scene illuminated by the vehicle lighting system, a graphics processing unit (GPU) 704 that processes the video data, and a vehicle headlamp module 706 including a set of LEDs 708 that may be arranged in a two-dimensional matrix. Vehicle headlamp module 706, in this example, also includes an LED controller 712 and an LED driver 714, which are configured to control and drive the LEDs 708. In some cases, LED controller 712 and an LED driver 714 comprise one or more separate circuits relative to LEDs 708 or alternatively, these components could be combined into a common circuit to define a fully integrated vehicle headlamp module 706 formed in a common silicon structure.

LED controller 712 may be configured to receive processed video data from the GPU, which may comprise a bitmap for driving the individual LEDs. LED driver 714 may comprise a DC-DC converter or other power device that is configured to drive LEDs 708 based at least in part on the processed video data. In some cases, LED driver 714 may comprise one or more DC to DC power converters utilizing parallel sets of linear current sources to deliver precise amounts of current to a load for different modes. In such examples, as the current demand increases, additional linear current sources may be used by LED driver 714.

GPU 704 may process raw video data and generate processed video data that is processed so as to achieve desired lighting effects by LEDs. Such processing by GPU 704, for example, may be based on navigation information collected or presented by the vehicle, based on object detection, or based on other factors. For example, camera sensors 702 may deliver real time video in raw format to GPU 704, and GPU 704 may process the raw video to identify scenes, roadways, features, obstacles, or other elements within the raw video data. In some examples, GPU 704 may perform one or more object detection algorithms on the raw video data in order to identify objects or elements within the video data captured by camera sensors 702. Based on such object detection algorithms, GPU 704 may modify the raw video data so as to generate processed video data, and the processed video data may be modified relative to the raw video data in a way that can achieve desired lighting effects by LEDs 708.

For example, object detection may be used to identify oncoming traffic, road hazards, or obstacles. Such object detection may be used to modify the raw video data such that the processed video data has pixelated data adjustments relative to the raw video data. The pixelated data adjustments may adjust the raw video data in places where objects are detected in the field of view. In this way, the processed data itself may be changed in a way that can help to achieve lighting effects by LEDs 708, such as glare reductions perceived by the operators of other vehicles, illumination of one or more objects, presentation of visual aids or guiding elements in order to help the vehicle operator projections of one or more symbols, projections of guiding lines for the vehicle operator, light shaping, reductions in light intensity, presentation of symbols, shapes or symbols, or the presentation of other effects. Other desirable lighting effects may also include the illumination of Trademarks or symbols, such as for presenting the driver with a welcome message or lighting effects when the vehicle is started or when the vehicle is in a parked mode.

Referring again to the object detection, GPU 704 may process raw video data and identify oncoming traffic in the raw video data. In this case, such objects may be used to cause specific pixelated intensity reductions such that LEDs 708 achieve glare reductions to the oncoming traffic. As another example, GPU 704 may process raw video data to identify an object or road hazard, such as on animal on the roadway, and in this case, objects may be used to cause specific pixelated intensity increases such that LEDs 708 illuminate the object with more light. The raw video data may comprise as a bit-map of RGB intensity values, and the processed video data may comprise a similar bit map of RGB intensity values that includes intensity adjustments to those pixels associated with the object detection.

Although RGB intensity values are discussed herein with regard to the video data, other video data formats could be such, such as formats that use chrominance and luminance values, LUV formats, CMYK formats, vectorized video data formats, or other video data formats. A bitmap of intensity values can be viewed as a bitmap of a video image, and can also be viewed as a bitmap of intensity values used to drive individual pixels of a matrix of LEDs. Thus, by processing a bitmap of an image, GPU 704 can essentially define a new bitmap of that image that is modified to achieve object detection, glare reduction, or other effects when that same bitmap is used to drive LEDs 708.

In accordance with this disclosure, system 70 shown in FIG. 7 may include a memory 720A or 720B that stores information for controlling a plurality of LEDs 708, wherein the information compensates for one or more failed LEDs of the plurality of LEDs 708. FIG. 7 shows two possible configurations for memory, although both memories 720A and 720B could also be used in some examples.

In some examples, system 70 includes memory 720A connected to GPU 704. In this example of system 70, the information in memory 720A is used by GPU 704 to adjust bitmaps so as to compensate for the one or more failed LEDs within LEDs 708. Memory 720A may be pre-configured to store locations of the failed elements (or neighbors thereof) or to store pre-configured driving values or adjustments for neighboring pixels to the failed LEDs. Alternatively, memory 720A may be configured with locations of the failed LEDs or locations of neighbors to failed pixels (or adjustments to neighboring pixels) that are updated during operation of the vehicle headlamp control circuit in response to failure data received from LED controller 712. In this case, LED controller 712 may include elements configured to identify failed LEDs within LEDs 708 and communicate the location of any failed LEDs back to memory 720A such as via GPU or a separate connection form LED controller 712 to memory 720A (not shown).

In some examples, the information stored in memory 720A identifies the locations of failed LEDs. In some examples, the information stored in memory 720A includes standard driving values for active pixels surrounded by other active pixels, and compensating driving values for one or more active pixels that are neighboring one or more failed pixels. The compensating driving values, for example, may be larger than the standard driving values so as to compensate for the one or more failed pixels, e.g., based on cross-talk as described above.

In some examples, the information stored in memory 720A comprises intensity values that correspond to duty cycles applied by LED driver 712 in driving LEDs 708, and at least some of the intensity values may be larger than other intensity values so as to compensate for one or more failed pixels within LEDs 708.

As an alternative (or in addition) to memory 720A, in some cases, system 70 may include memory 720B, which is connected to LED driver 714. The information in memory 720B may be used to adjust bitmaps so as to compensate for the one or more failed LEDs within LEDs 708. For example, the information stored in memory 720B may include gamma corrections, and the gamma corrections may be defined so as to compensate for one or more failed pixels of the matrix of LEDs. Memory 720B may be pre-configured to store locations of the failed elements (or neighbors thereof) or to store pre-configured adjustments for neighboring pixels to the failed LEDs. Alternatively, memory 720B may be configured with locations of the failed LEDs or locations of neighbors to failed pixels (or adjustments to neighboring pixels) that are updated during operation of the vehicle headlamp control circuit in response to failure data received from LED controller 712. In this case, LED controller 712 may include elements configured to identify failed LEDs within LEDs 708 and communicate the location of any failed LEDs back to memory 720B (in which case, a connection between LED controller 712 and memory 720B would also be included).

In some examples, the information stored in memory 720B identifies the locations of failed LEDs. In some examples, the information stored in memory 720B includes compensating values or adjustments to be applied to one or more active pixels that are neighboring one or more failed pixels. The compensating values or adjustments, for example, may cause driving values applied by LED driver 714 to be larger than the standard driving values so as to compensate for the one or more failed pixels, e.g., based on cross-talk as described above.

Figure 8:
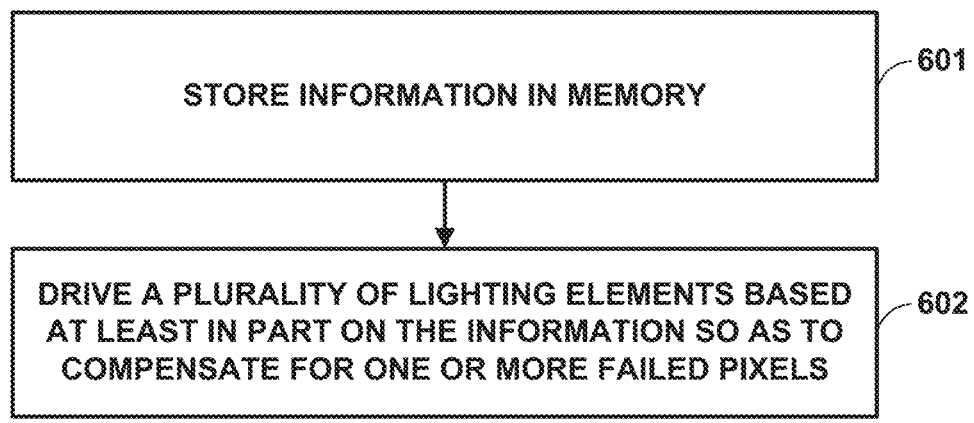
FIG. 8 is a flow diagram consistent with techniques according to this disclosure.

FIG. 8 is a flow diagram consistent with techniques according to this disclosure. FIG. 8 will be described from the perspective of circuit elements illustrated in FIG. 1 and FIG. 2, although other circuits and devices could also perform the techniques of FIG. 8.

FIG. 8 generally shows a method of controlling a plurality of lighting elements of a vehicle headlamp. In some cases, the control of the plurality of lighting elements shown in FIG. 8 may occur by a circuit that is inside a vehicle during operation of the vehicle. In other cases, however, the control of the plurality of lighting elements shown in FIG. 8 may occur during a manufacturing process of the vehicle headlamp.

As shown in FIG. 8, the method may comprise storing information in memory 15, 25 (601), and driving the plurality of lighting elements based at least in part on the information so as to compensate for one or more failed pixels (602). According to this disclosure, the information stored in memory 15, 25 compensates for one or more failed elements of the plurality of lighting elements (e.g., one or more failed LEDs within a matrix of LEDs 102, 202 shown in FIG. 1 and FIG. 2).

In some examples, memory 15 is communicatively coupled to a GPU 10 that communicates bitmaps to a driver circuit 100, in which case the method shown in FIG. 8 may further comprise: receiving a first bitmap in GPU 10, adjusting the first bitmap to create a second bitmap based on the information stored in memory 15, communicating the second bitmap to the driver circuit 100, and driving the plurality of lighting elements (e.g., LEDs 102) based on second bitmap.

In other examples memory 25 is communicatively coupled to driver circuit 200, in which case the method shown in FIG. 8 may further comprise receiving a first bitmap at driver circuit 200 from GPU 20, adjusting the first bitmap to create a second bitmap based on the information stored in memory 25, and driving the plurality of lighting elements (e.g., LEDs 202) based on second bitmap.

As explained herein, in some examples memory 15, 25 is pre-configured (e.g., prior to circuit operation and during a circuit manufacturing stage) to store locations of the failed elements. In other examples, memory 15, 25 is configured with locations of the failed elements in response to failure data, in which case a method may further comprise determining the failure data via driver circuit 100, 200, and storing the failure data in memory 15, 25. With the example of FIG. 2, where memory 25 is communicatively coupled to driver circuit 200 and driver circuit 200 receives bitmaps from GPU, the method may further comprise adjusting the bitmaps based on based on failure data in memory 25 to compensate for the one or more failed elements of the plurality of lighting elements (e.g., LEDs).

In some examples, the information stored in memory 15, 25 includes standard driving values for active pixels surrounded by other active pixels, and compensating driving values for one or more active pixels that are neighboring one or more failed pixels, wherein the compensating driving values are larger than the standard driving values so as to compensate for the one or more failed pixels. Other examples of the information stored in memory 15, 25 are also described above.

In some cases, the method shown in FIG. 8 may be performed during a manufacturing process, in which case the method may further include manufacturing the plurality of lighting elements, wherein manufacturing includes determining a total number of failed pixels during a manufacturing stage, using the plurality of lighting elements in the vehicle headlamp system in response to the total number being below a threshold. In this case, using the plurality of lighting elements in the vehicle headlamp system may include driving the plurality of lighting elements based on the information stored in memory 15, 25. The method may also include discarding the plurality of lighting elements and using a different plurality of lighting elements in the vehicle headlamp system in response to the total number being above the threshold. In other words, there may be a limit on the number of pixel failures that can be compensated using the techniques of this disclosure. Accordingly, if there are too many failed pixels on a given LED circuit, that circuit may be discarded. However, if there are some failed pixels but not too many failed pixels, the techniques of this disclosure may allow the LED circuit to be used even with failed pixels. In some cases, the techniques of this disclosure can compensate for one failed pixel or many failed pixels in a way that may be unperceivable to the human eye.

In still additional examples, a manufacturing technique may include calibrating the plurality of lighting elements to measure cross-talk in a manufacturing stage, and defining the information to be stored in memory 15, 25 based on the calibrating. FIG. 4 and specifically the transition region 43 shown in FIG. 4 may define one useful place to measure cross-talk, although other areas or regions of an LED matrix could be used, and lighting patterns could be used when measuring cross-talk.

The following clauses may illustrate one or more aspects of the disclosure.

Clause 1—A vehicle headlamp control circuit configured to control a vehicle headlamp comprising a plurality of lighting elements, the vehicle headlamp control circuit comprising: a memory that stores information for controlling the plurality of lighting elements; and a driver circuit that drives the plurality of lighting elements based on the information, wherein the information compensates for one or more failed elements of the plurality of lighting elements.

Clause 2—The vehicle headlamp control circuit of clause 1, further comprising: a GPU that communicates bitmaps to the driver circuit, wherein the memory is coupled to the GPU and the information is used by the GPU to adjust the bitmaps to compensate for the one or more failed elements of the plurality of lighting elements.

Clause 3—The vehicle headlamp control circuit of clause 1 or 2, wherein the memory is communicatively coupled to the driver circuit and the driver circuit receives bitmaps from a GPU, wherein the driver circuit adjusts the bitmaps based on based on the information in the memory to compensate for the one or more failed elements of the plurality of lighting elements.

Clause 4—The vehicle headlamp control circuit of any of clauses 1-3, wherein the memory is pre-configured to store locations of the failed elements.

Clause 5—The vehicle headlamp control circuit of any of clauses 1-4, wherein the memory is configured with locations of the failed elements that are updated during operation of the vehicle headlamp control circuit in response to failure data received from the driver circuit.

Clause 6—The vehicle headlamp control circuit of any of clauses 1-5, wherein the information includes standard driving values for active pixels surrounded by other active pixels, and compensating driving values for one or more active pixels that are neighboring one or more failed pixels, wherein the compensating driving values are larger than the standard driving values so as to compensate for the one or more failed pixels.

Clause 7—The vehicle headlamp control circuit of any of clauses 1-6, wherein the information includes one or more compensating driving values that compensate for the one or more failed pixels based on cross-talk.

Clause 8—The vehicle headlamp control circuit of any of clauses 1-7, wherein the information comprises intensity values that correspond to duty cycles applied by the driver circuit in driving the plurality of lighting elements, wherein at least some of the intensity values are larger than other intensity values so as to compensate for one or more failed elements of the plurality of lighting elements.

Clause 9—The vehicle headlamp control circuit of any of clauses 1-8, wherein the information comprises gamma corrections applied by the driver circuit in driving the plurality of lighting elements so as to compensate for one or more failed elements of the plurality of lighting elements.

Clause 10—The vehicle headlamp control circuit of any of clauses 1-9, wherein the plurality of lighting elements comprise individually controllable light emitting diodes (LEDs).

Clause 11—A method comprising: driving a plurality of lighting elements of a vehicle headlamp based on information, wherein the information compensates for one or more failed elements of the plurality of lighting elements.

Clause 12—The method of clause 11, the method further comprising: storing the information in a memory.

Clause 13—The method of clause 12, wherein the memory is communicatively coupled to a GPU that communicates bitmaps to a driver circuit, the method further comprising: receiving a first bitmap in the GPU; adjusting the first bitmap to create a second bitmap based on the information; communicating the second bitmap to the driver circuit; and driving the plurality of lighting elements based on second bitmap.

Clause 14—The method of clause 12 or 13, wherein the memory is communicatively coupled to a driver circuit, the method further comprising: receiving a first bitmap at the driver circuit from a GPU; adjusting the first bitmap to create a second bitmap based on the information; and driving the plurality of lighting elements based on second bitmap.

Clause 15—The method of any of clauses 12-14, wherein the memory is pre-configured to store locations of the failed elements.

Clause 16—The method of any of clauses 12-15, wherein the memory is configured with locations of the failed elements in response to failure data, the method further comprising: determining the failure data via a driver circuit; and storing the failure data in the memory.

Clause 17—The method of any of clauses 12-16, wherein the memory is communicatively coupled to the driver circuit and the driver circuit receives bitmaps from a GPU, the method further comprising: adjusting the bitmaps based on based on the failure data in the memory to compensate for the one or more failed elements of the plurality of lighting elements.

Clause 18—The method of any of clauses 11-17, wherein the information includes standard driving values for active pixels surrounded by other active pixels, and compensating driving values for one or more active pixels that are neighboring one or more failed pixels, wherein the compensating driving values are larger than the standard driving values so as to compensate for the one or more failed pixels.

Clause 19—The method of any of clauses 11-18, further comprising manufacturing the plurality of lighting elements, wherein manufacturing includes: determining a total number of failed pixels during a manufacturing stage; using the plurality of lighting elements in the vehicle headlamp system in response to the total number being below a threshold, wherein using includes driving the plurality of lighting elements based on the information; and discarding the plurality of lighting elements and using a different plurality of lighting elements in the vehicle headlamp system in response to the total number being above the threshold.

Clause 20—The method of any of clauses 11-19, further comprising: calibrating the plurality of lighting elements to measure cross-talk in a manufacturing stage; and defining the information based on the calibrating.

Clause 21—A system comprising: a vehicle headlamp comprising a plurality of lighting elements; and a vehicle headlamp control circuit configured to control the vehicle headlamp. The vehicle headlamp control circuit comprises: a memory that stores information for controlling the plurality of lighting elements; and a driver circuit that drives the plurality of lighting elements based on the information, wherein the information compensates for one or more failed elements of the plurality of lighting elements.

Various aspects have been described in this disclosure. These and other aspects are within the scope of the following claims.

The invention claimed is:

1. A vehicle headlamp control circuit configured to control a vehicle headlamp comprising a plurality of lighting elements, the vehicle headlamp control circuit comprising:
   a memory that stores information for controlling the plurality of lighting elements; and
   a driver circuit that drives the plurality of lighting elements based on the information, wherein the information compensates for one or more failed elements of the plurality of lighting elements, wherein the information comprises gamma corrections applied by the driver circuit in driving the plurality of lighting elements so as to compensate for one or more failed elements of the plurality of lighting elements.

2. The vehicle headlamp control circuit of claim 1, wherein the information further comprises
   standard driving values for active pixels surrounded by other active pixels, and compensating driving values for one or more active pixels that are neighboring one or more failed pixels, wherein the compensating driving values are larger than the standard driving values so as to compensate for the one or more failed pixels.

3. The vehicle headlamp control circuit of claim 1, further comprising:
   a graphics processor unit (GPU) that communicates bitmaps to the driver circuit, wherein the memory is coupled to the GPU and the information is used by the GPU to adjust the bitmaps to compensate for the one or more failed elements of the plurality of lighting elements.

4. The vehicle headlamp control circuit of claim 1, wherein the memory is communicatively coupled to the driver circuit and the driver circuit receives bitmaps from a graphics processor unit (GPU), wherein the driver circuit adjusts the bitmaps based on based on the information in the memory to compensate for the one or more failed elements of the plurality of lighting elements.

5. The vehicle headlamp control circuit of claim 1, wherein the memory is pre-configured to store locations of the failed elements.

6. The vehicle headlamp control circuit of claim 1, wherein the memory is configured with locations of the failed elements that are updated during operation of the vehicle headlamp control circuit in response to failure data received from the driver circuit.

7. The vehicle headlamp control circuit of claim 1 wherein the gamma corrections compensate for the one or more failed pixels based on cross-talk.

8. The vehicle headlamp control circuit of claim 1, wherein the plurality of lighting elements comprise individually controllable light emitting diodes (LEDs).

9. A method comprising:
   manufacturing a driver circuit for driving a plurality of lighting elements of a vehicle headlamp based on information, wherein the information compensates for one or more failed elements of the plurality of lighting elements, wherein the information includes standard driving values for active pixels surrounded by other active pixels, and compensating driving values for one or more active pixels that are neighboring one or more failed pixels, wherein the compensating driving values are larger than the standard driving values so as to compensate for the one or more failed pixels;
   calibrating the plurality of lighting elements to measure cross-talk in a manufacturing stage; and
   defining the information based on the calibrating.

10. The method of claim 9, further comprising:
    storing the information in a memory.

11. The method of claim 10, wherein the memory is communicatively coupled to a graphics processor unit (GPU) that communicates bitmaps to a driver circuit, the method further comprising manufacturing a system to be configured to:
    receive a first bitmap in the GPU;
    adjust the first bitmap to create a second bitmap based on the information;
    communicate the second bitmap to the driver circuit; and
    drive the plurality of lighting elements based on second bitmap.

12. The method of claim 10, wherein the memory is communicatively coupled to a driver circuit, the method further comprising manufacturing a system to be configured to:
    receive a first bitmap at the driver circuit from a graphics processor unit (GPU);
    adjust the first bitmap to create a second bitmap based on the information; and
    drive the plurality of lighting elements based on second bitmap.

13. The method of claim 10, wherein the memory is pre-configured to store locations of the failed elements.

14. The method of claim 10, wherein the memory is configured with locations of the failed elements in response to failure data, the method further comprising manufacturing a system to be configured to:
    determine the failure data via a driver circuit; and
    store the failure data in the memory.

15. The method of claim 14, wherein the memory is communicatively coupled to the driver circuit and the driver circuit receives bitmaps from a graphics processor unit (GPU), the method further comprising manufacturing the system to be configured to:
    adjust the bitmaps based on based on the failure data in the memory to compensate for the one or more failed elements of the plurality of lighting elements.

16. The method of claim 9, further comprising manufacturing the plurality of lighting elements, wherein manufacturing the plurality of lighting elements includes:
    determining a total number of failed pixels during a manufacturing stage;
    using the plurality of lighting elements in the vehicle headlamp system in response to the total number being below a threshold, wherein using includes driving the plurality of lighting elements based on the information; and
    discarding the plurality of lighting elements and using a different plurality of lighting elements in the vehicle headlamp system in response to the total number being above the threshold.

17. A system comprising:
    a vehicle headlamp comprising a plurality of lighting elements; and
    a vehicle headlamp control circuit configured to control the vehicle headlamp, the vehicle headlamp control circuit comprising:
    a memory that stores information for controlling the plurality of lighting elements; and a driver circuit that drives the plurality of lighting elements based on the information, wherein the information compensates for one or more failed elements of the plurality of lighting elements, wherein the information comprises gamma corrections applied by the driver circuit in driving the plurality of lighting elements so as to compensate for one or more failed elements of the plurality of lighting elements.

* * * * *